United States Patent
Friedrichsen et al.

(12)

(10) Patent No.: US 6,594,993 B1
(45) Date of Patent: Jul. 22, 2003

(54) HYDRAULIC DRIVING DEVICE AND SYSTEM FOR A VEHICLE

(75) Inventors: Welm Friedrichsen, Nordborg (DK); Uffe Lykke Eriksen, Sønderbog (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/715,610

(22) Filed: Nov. 17, 2000

(30) Foreign Application Priority Data

Dec. 23, 1999 (DE) .......................................... 199 62 807
Jun. 20, 2000 (DE) .......................................... 100 30 282

(51) Int. Cl.$^7$ ............................................. F16D 31/02
(52) U.S. Cl. ............................................. 60/442; 92/24
(58) Field of Search ................. 60/435, 442, 436; 92/18, 19, 20, 24; 418/187

(56) References Cited

U.S. PATENT DOCUMENTS

| | | | |
|---|---|---|---|
| 4,777,865 A | | 10/1988 | Gautier |
| 5,114,324 A | * | 5/1992 | Spindeldreher ............. 188/170 |
| 5,190,445 A | | 3/1993 | Ikari |
| 5,251,537 A | | 10/1993 | Hoshino |
| 5,697,286 A | * | 12/1997 | Grahl ............................. 92/24 |
| 5,895,099 A | | 4/1999 | Diecke |

FOREIGN PATENT DOCUMENTS

| | | |
|---|---|---|
| EP | 0533953 A1 | 3/1993 |
| EP | 0533958 A1 | 3/1993 |
| GB | 2154694 A1 | 9/1985 |

* cited by examiner

*Primary Examiner*—F. Daniel Lopez
(74) *Attorney, Agent, or Firm*—Barnes & Thornburg

(57) ABSTRACT

Hydraulic driving device with a hydraulic motor and a bearing arrangement in which the output shaft of the hydraulic motor is supported. Typically, the bearing arrangement is axially supported on the output shaft between a shoulder of the output shaft and a nut screwed onto the output shaft. To reduce overall length, the invention provides that the shoulder is located on the side of the bearing arrangement opposite from the end of the output side of the output shaft, and a friction-disc pack directly bears on the bearing arrangement. The motor has a braking device, including the friction-disc pack and at least one braking cylinder with a spring chamber and a release chamber. A braking valve in the braking position supplies the spring chamber with the load pressure and the release chamber with the tank pressure, and in the release position supplies the spring chamber with the tank pressure and the release chamber with the load pressure. The motor has a flushing line and a leakage line, which in one form of the invention are connected with the spring chamber and led to a tank via the braking valve. In another form of the invention, the leakage line is connected to the release chamber and the flushing line is connected to the spring chamber. In yet another form, the leakage line is connected to the spring chamber and the flushing line is connected to the release chamber. The combination of lines from the braking device and the flushing system results in simplifications.

3 Claims, 5 Drawing Sheets

HYDRAULIC DRIVING DEVICE AND SYSTEM FOR A VEHICLE

BACKGROUND OF THE INVENTION

This invention is directed to a hydraulic driving hydraulic system for a vehicle, and in particular to a system which has an adjustable pump and at least one motor, with the system being held at a load pressure level. The hydraulic motor is shortened in overall dimension by rearrangement of the elements of the motor to eliminate gaps occurring previously. The invention is further directed to a braking device for the system, having at least one braking cylinder with a spring chamber and a release chamber, and a braking valve. In the braking position, the braking valve supplies the spring chamber with load pressure and the release chamber with tank pressure, and in the release position, the braking valve supplies the spring chamber with tank pressure and the release chamber with load pressure.

A driving system of this kind is, for example, known from EP 0 909 690 A2. It is particularly suited for agricultural and industrial working machines, like farm tractors, harvesters and construction machines, and is most frequently used in skid steered loaders. In the known case, there is an auxiliary pump, which supplies a number of working motors, on whose outlet two pressure limiting valves ensure that a load pressure is produced, which is supplied to both the hydraulic system and the braking device. If the hydraulic system is not activated, only the spring acts to brake the vehicle, for example to prevent it from rolling down a slope. If, however, the hydraulic system is activated, the braking valve is operated; causing that the load pressure in the release chamber makes the spring in the spring chamber inactive. When, however, an error requiring braking occurs, the braking valve is de-energised, so that the spring, supported by the load pressure in the spring chamber, causes a safe braking, also in relation to a rotation of the motor. One disadvantage is that in the working system a relatively large oil quantity has to be brought to a higher pressure.

A commercially available hydraulic driving device, shown in part in FIG. 1, is arranged so that a gap occurs between a friction-disc pack used as part of the braking device and a nut for retaining the output shaft bearing in place. The gap increases the overall length of the motor. In addition, the motor using helical springs and an elongated annular piston, which also contribute to an unnecessarily overall axial length of the motor.

SUMMARY OF THE INVENTION

The invention is based on the task of providing a hydraulic driving system, which has a new braking device and a motor of reduced overall axial length.

The motor has a flushing line, which is connected with the spring chamber and led to a tank via the braking valve. In the release position the braking valve opens the flushing line in the direction of the tank, and in the braking position prevents a pressure reduction in the flushing line.

With this arrangement, the lines of the flushing system and the braking device are partly combined, which causes savings and new line arrangements. This combination is possible, as the flushing operation is not disturbed, as during release operation the flushing line is connected with the tank and during braking operation flushing is not required. At least partly, the pressure build-up in the spring chamber is supported by the pressure medium flowing in through the flushing line.

In a one embodiment, in the braking position the braking valve blocks the flushing line. This blocking prevents a pressure medium discharge via the flushing line and the leakage line of the motor. A pressure will automatically build up in the spring chamber, which is almost equal to the load pressure of the hydraulic system.

An equally favorable alternative is that in the braking position the braking valve supplies the flushing line with the load pressure. Here, the pressure increase in the spring chamber, caused by the load pressure, is supported by the supply of pressure medium from the flushing line.

As a further alternative, the leakage line of the motor is connected to the release chamber and the flushing line is connected to the spring chamber. In yet a further embodiment, the leakage line is connected to the spring chamber and the flushing line is connected to the release chamber. In either alternative, an increase of the braking force occurs in the braking position when the braking valve blocks connection of the spring chamber to tank pressure, causing a pressure buildup in the spring chamber.

It is advantageous that a load pump is provided to maintain the load pressure in the system, at the outlet of which pump a pressure control valve is connected. The load pump can be dimensioned for relatively low pressures and small filling quantities. The size of the load pressure only has to be chosen so high that the braking device is certain to work.

To maintain the load pressure in the motor a flushing valve is provided, whose outlet is also connected with the spring chamber via a throttle. Thus, also the outlet line of the flushing valve can be combined with lines of the braking device.

In the hydraulic motor, to shorter the length, the shoulder is arranged on the side of the bearing arrangement opposite from the end of the output side of the output shaft, and the friction-disc pack bears on the bearing arrangement.

With this solution, a gap between the friction-disc pack and the bearing arrangement is avoided. Additionally, the output shaft can be correspondingly shortened at the side of the hydraulic motor.

Preferably, the spring arrangement is a cup spring. This gives an additional shortening of the overall axial length.

Thus, the annular piston can be made as a substantially flat annular disc. This also causes a reduction of the overall length.

BRIEF DESCRIPTION OF THE DRAWINGS

The invention is described in greater detail in the following description of preferred embodiments, taken in conjunction with the drawings, in which.

DESCRIPTION OF PREFERRED EMBODIMENTS

Figure 1:
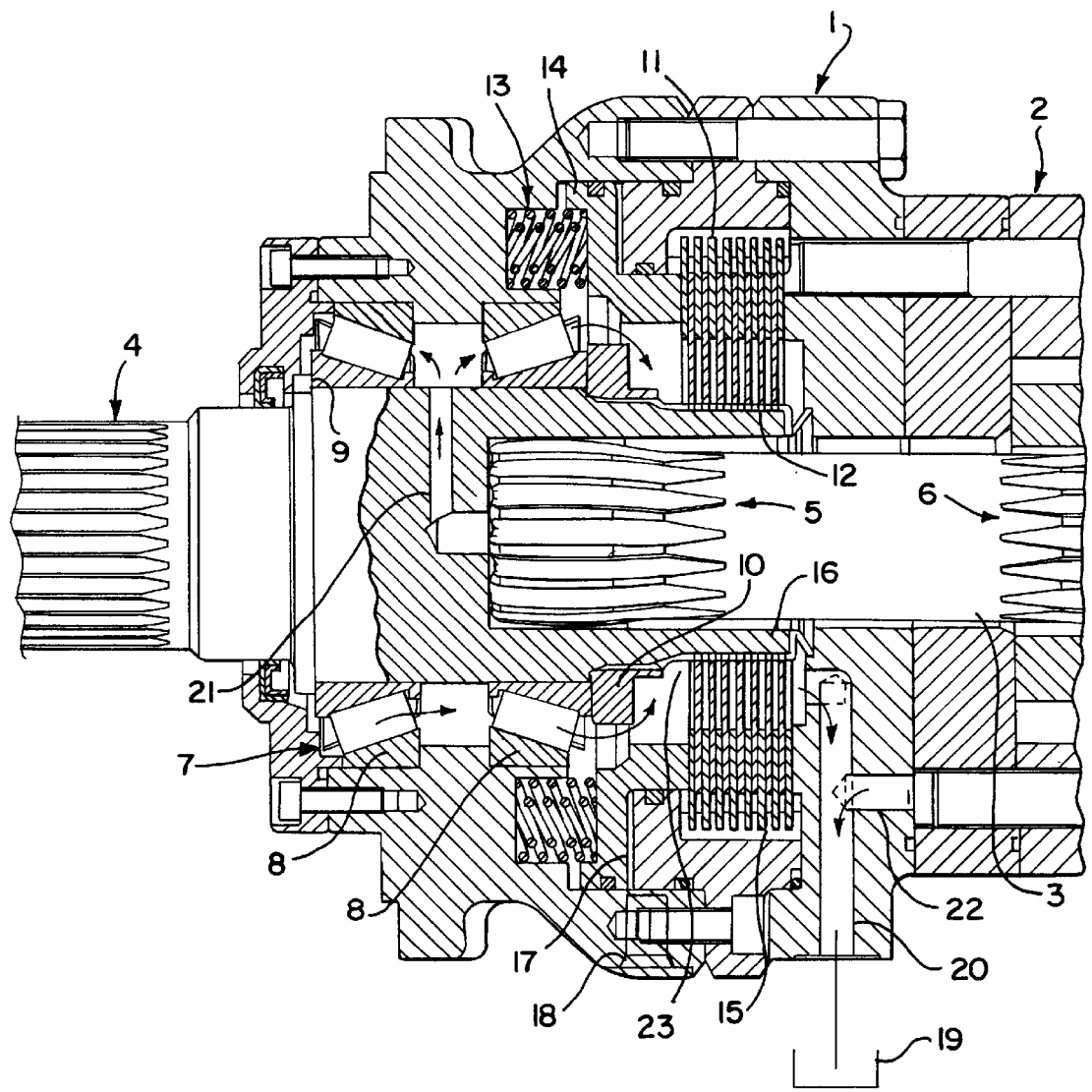
FIG. 1 is an axial cross section of a commercially-available hydraulic motor.

A known, commercially available hydraulic driving device of this kind is shown in part in an axial section in FIG. 1. A a hydraulic motor 2 in the shape of a gerotor motor is arranged in a multipart housing 1. Via a cardan shaft 3, the hydraulic motor 2 is: articulately connected with an output shaft 4 in the housing 1 through key groove connections 5 and 6. Additionally, the housing 1 comprises a bearing arrangement 7, which has at least one, here two, roller bearings 8. The output shaft 4 is supported in the bearing arrangement 7, the bearing arrangement 7 being axially supported by the output shaft 4, on one side by means of a shoulder 9 of the output shaft 4 and on the other side by means of a nut 10 screwed onto the output shaft 4. Further, the housing includes a friction-disc pack 11 of a multi-disc brake being unrotatably connected with the output shaft 4 via a key groove connection 12. Via a spring arrangement 13, made of helical springs, the friction-disc pack 11 is axially loaded against a radial, housing fixed flange surface 15 via an annular piston 14. The shoulder 9 bears on the side of the bearing arrangement 7 facing the hydraulic motor 2, and the nut 10 bears on the side of the bearing arrangement 7 facing the motor. The friction-disc pack 11 is arranged on an end section 16 of the output shaft 4, which extends the output shaft in the direction of the hydraulic motor 2. The friction-disc pack 11 is part of a safety brake. The brake is released by means of pressure oil from a pump (FIGS. 4, 7 and 8), driving the hydraulic motor 2, via a pressure oil connection 18 connected with a release chamber 17, the pressure oil lifting the annular piston 14 from the friction-disc pack against the force of the spring arrangement 13. Through a connection 20 connected with the tank 19 lubricating oil leaving the hydraulic motor 2 is drained off along the cardan shaft 3, the key groove connection 5, a channel 21 in the output shaft 4, the bearing arrangement 7 and the friction discs, as indicated by the arrows drawn. Additionally, leakage oil leaving the motor is led to the tank 19 through a channel 22 and the connection 20. When the pump, and/or a combustion motor driving the pump, of, for example, a farm or industrial vehicle, like for instance a farming tractor, a harvester or a construction machine, is not in operation or fails, so that pressure oil is not led to the pressure oil connection 18 either, only the spring arrangement 13 of the multi-disc brake is active for the braking of the vehicle, for example to prevent it from rolling on down a slope.

The inner diameter of the thread of the output shaft 4 screwed with the nut 10 is larger than the outer diameter of the end section 16 of the output shaft 4, in order that the nut 10 can unpreventedly be led over the end section 16 and be screwed together with the thread of the output shaft. The bottom of the grooves of the key groove connection 12 formed in the end section 16 therefore slopes up radially outwards in the end lying on the thread-side of the output shaft 4, to enable the radially outwards movement at the end of the milling process of a side milling cutter used to create the grooves, and to ensure that the deepest section of the grooves is as close to the thread of the output shaft 4 as possible. The end section of the groove bottom projecting radially outwards, however, prevents that the discs of the friction-disc pack 11 can be arranged in the immediate vicinity of the nut or thread, respectively, of the output shaft 4, so that a gap 23 remains between the friction-disc pack 11 and the nut 10. This gap 23 or distance increases the overall length of the hydraulic driving device. Additionally, the helical springs of the spring arrangement 13 and the annular piston 14 have a relatively large axial length, which also contributes to the extension of the overall axial length of the hydraulic driving device.

Figure 2:
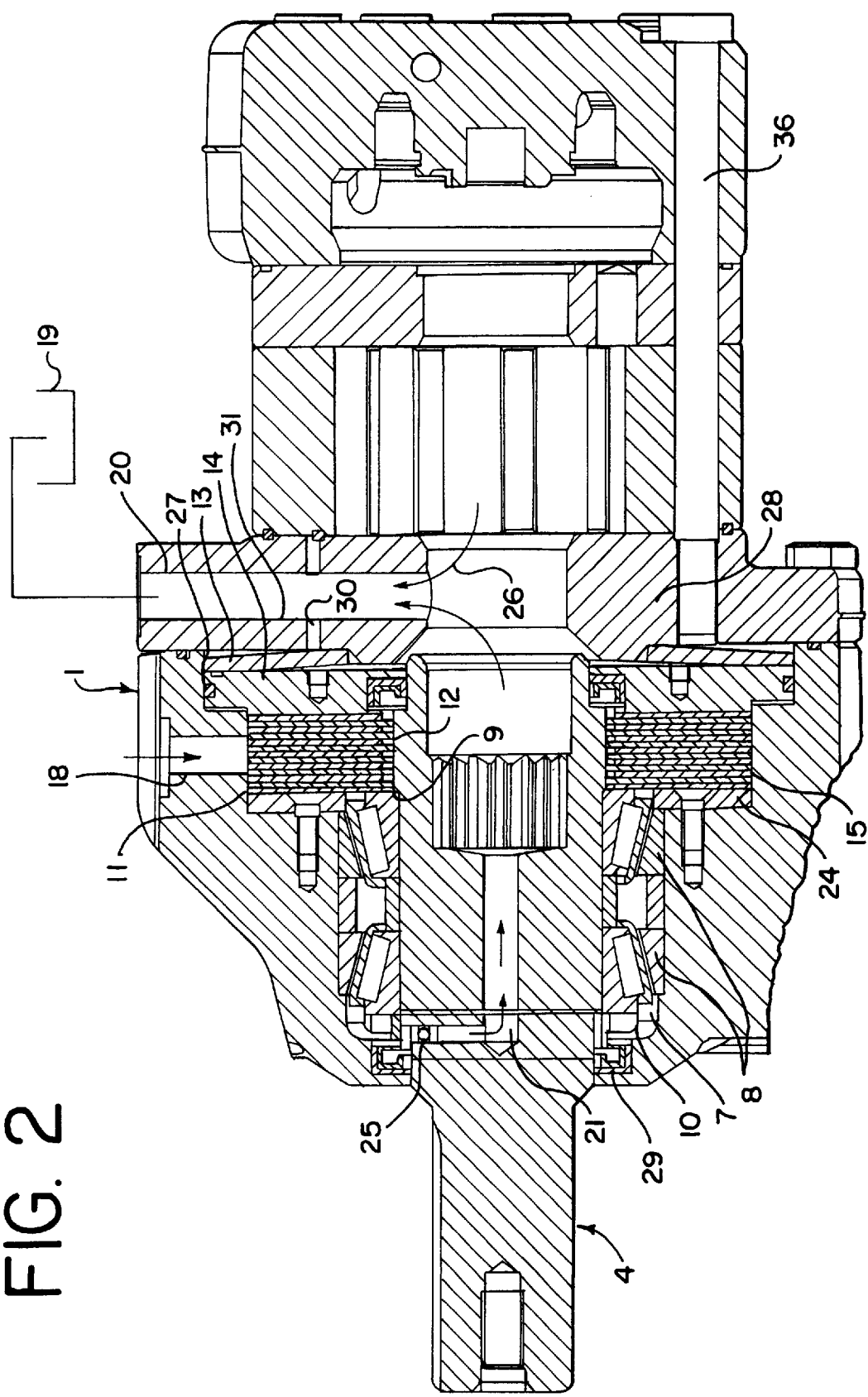
FIG. 2 is an axial cross section of a first embodiment of a hydraulic motor according to the invention.

In the first embodiment, shown in FIG. 2, of the hydraulic driving device according to the invention, a housing 1 comprises a hydraulic motor 2, and a bearing arrangement 7 having at least one roller bearing 8. The output shaft 4 of the hydraulic motor 2 is supported in the bearing arrangement 7, the bearing arrangement 7 being axially supported on the output shaft 4, on one side through a shoulder 9 of the output shaft 4 and on the other side through a nut 10 screwed onto the output shaft 4. Further, a friction-disc pack 11 surrounding the output shaft 4 is unrotatably connected with the output shaft by means of a key groove connection 12, and the discs of the friction-disc pack 11 loaded axially via an annular piston 14 against a radial, housing-fixed counter-flange surface 15 by means of a spring arrangement 13. Here, however, the shoulder 9 is formed on the side of bearing arrangement 7 opposite from the output-side end of the output shaft 4, and the friction-disc pack 11 bears with the side opposite from the spring arrangement 13 on the bearing arrangement 7. The spring arrangement 13 is a cup spring and the annular piston 14 is a substantially flat annular disc. This gives an axially shorter overall length of the hydraulic driving device according to FIG. 2, than that of the known hydraulic driving device according to FIG. 1, as the gap 23 still remaining in the hydraulic driving device according to FIG. 1 is avoided, and the cup spring 13 and the annular piston 14 acted upon by the spring are axially shorter and more flat, respectively.

While being suppressed by the spring arrangement 13 via the annular piston 14, to brake the output shaft 4, the counter-flange surface 15 of the friction-disc pack 11 is made by a flat safety ring 24, which fixes the radially outer bearing rings of the roller bearing 8 against an inner shoulder of the housing via an intermediary ring. An intermediary ring is also arranged between the inner bearing rings of the roller bearing.

To release the multi-discs brake, the pressure oil is again supplied via a pressure oil connection 18. In this case, pressure oil is introduced, directly into the disc chamber of the friction-disc pack 11, from where it is drained off to the tank 19 together with the leakage and flushing oil 26 escaping from the hydraulic motor 2, through the bearing arrangement 7, a throttle 25 in the channel 21 of the output shaft 4, the channel 21, the key groove connection and the connection 20.

Like in the known hydraulic driving device of FIG. 1, the pressure oil here serves the release of the friction-disc pack 11, that is, it presses the annular piston 14 away from the discs against the force of the spring arrangement 13. To prevent the pressure oil from leaking from the disc chamber into the chamber comprising the spring arrangement 13 and the housing bore comprising the cardan shaft (not shown), the annular piston 14 is sealed on its radial outside through a static sealing 27 against the housing 1 and on its radial inside through a dynamic sealing 28 against the rotating output shaft 4. On the output side, the output shaft is sealed by a dynamic sealing 29 against the housing. The spring arrangement 13 and the annular piston 14 are supported on the side of the friction-disc pack 11 facing the hydraulic motor.

The safety ring 24 is fixed on the housing 1 by means of screws. Again, the travel of the oil is shown by means of arrows.

Via a bore 30, the spring chamber is connected with the channel 31 leading to the connection 20. Thus, it is firstly possible that oil being available in the spring chamber when releasing the multi-disc brake is drained off to the tank 19 via the bore 30 and the channel 31. Secondly, it is possible, when the connection from the connection 20 to the tank 19 is blocked by a braking valve (FIGS. 4–8), to supply pressure oil to the spring chamber through the bore 30, thus increasing the force of the spring arrangement 13, when required, to improve the braking effect.

Figure 3:
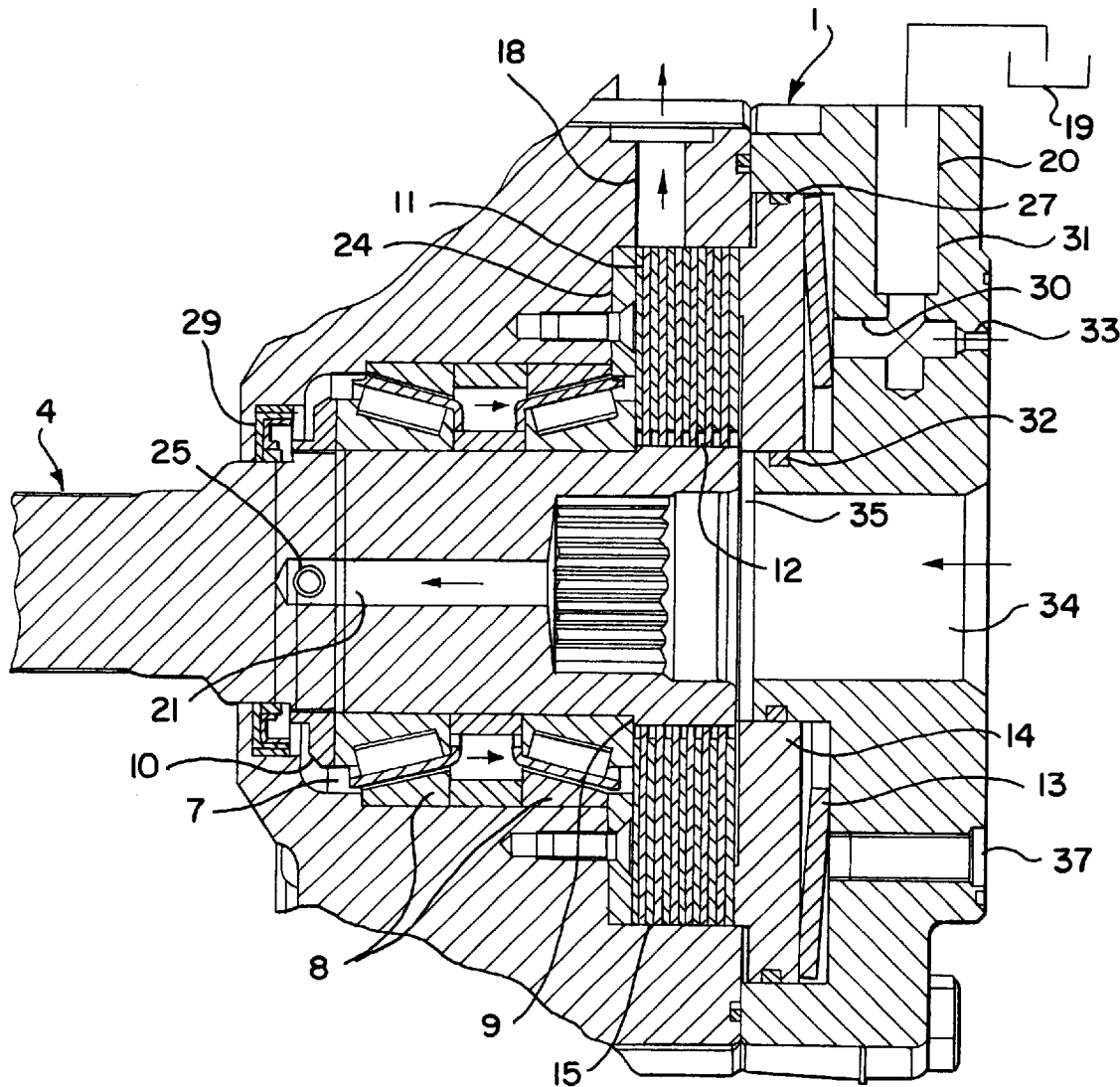
FIG. 3 is an axial cross section of a second embodiment of a hydraulic motor according to the invention.

The embodiment according to FIG. 3 substantially only differs from that in FIG. 2 in that the annular piston 14 is also sealed against the housing 1 on its radial inside, again by means of a static sealing 32. This has the advantage that the sealing 32 can stand pressures in both directions and the braking force can be improved by a pressure acting upon the spring force by means of flushing oil, which escapes from the hydraulic motor (not shown in this figure) and is led into the spring chamber via the bore 33 and the bore 30, while the line leading from the connection 20 to the tank 19 is blocked by a braking valve. Via the housing bore 34, past the cardan shaft (not shown), leakage oil can further be led in the direction of the flow arrow, which flows through the friction-disc pack 11 via the channel 21, the throttle 25 and the bearing arrangement 7 in the direction of the flow arrows shown, and also lubricates the friction-disc pack 11. To release the multi-disc brake, pressure oil can, when the connection line from the connection 20 to the tank 19 is open, be supplied via the connection 18 (against the flow arrows shown), which oil presses the annular piston 14 away from the friction-disc pack 11 against the force of the spring arrangement 13.

Between the front face of the output shaft 4 facing the hydraulic motor and the housing 1, there is a narrow gap 35, which is not sealed. Therefore, a small share of the leakage oil can flow from the hydraulic motor via the bore 34 and the gap 35, whereas the remaining share of the leakage oil flows through the output shaft 4 and the bearing arrangement 7. The gap 35 is sufficiently narrow to ensure that sufficient oil remains to cool and lubricate the key groove connection 12 and the bearing arrangement 7. The leakage oil is then led to the tank 19 via the connection 18 and an overflow valve.

The leakage oil escaping from the hydraulic motor is led into an annular groove 37 via the bores for the connecting screws 36 (see FIG. 2), and from there to the bore 33.

Figure 4:
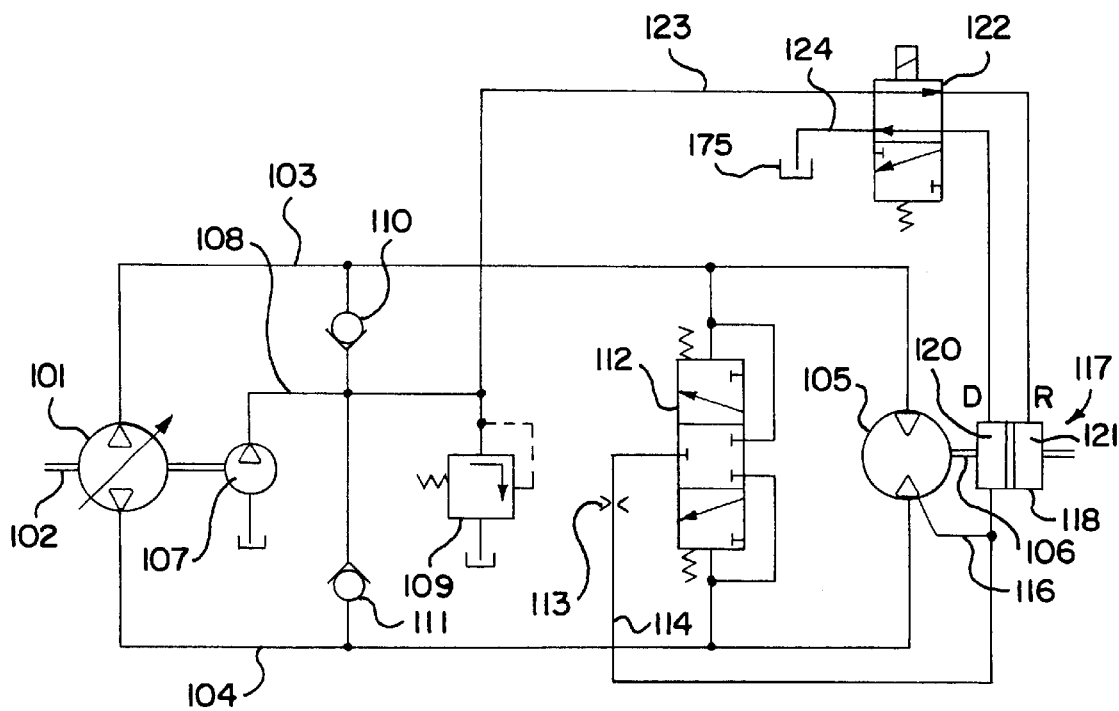
FIG. 4 is a simplified schematic illustration of a driving system according to the invention.

The hydraulic driving system shown in FIG. 4 has a pump 101, which is driven by a driving shaft 102, for example of a combustion engine, and whose pump capacity is adjustable for the purpose of changing the driving speed. Via motor lines 103 and 104, this pump is connected with a hydraulic motor 105, whose outlet shaft 106 is connected with wheels (not shown).

A load pump 107 driven together with the pump 101 has an outlet 108, to which a pressure control valve 109 is connected, which maintains a load pressure. The outlet 108 is also connected with the motor lines 103 and 104 via non-return valves 110 and 111, respectively. By means of corresponding refill processes, this maintains the load pressure in the complete system.

A flushing valve 112 ensures that when the pressure in one motor line is predominant, pressure fluid is drained off from the other motor line and led to the tank 115 via an outlet line 114 provided with a restriction 113. In this way, the motor lines are held at a pressure corresponding to the load pressure. The motor 105 has a flushing line 116, which is connected with the outlet line 114 and thus with the tank 115.

Via this flushing line pressure fluid flows under the influence of the difference between load pressure and tank pressure.

A braking device 117 is connected to the motor shaft 106, which braking device has a braking cylinder 118 with a spring chamber 120 containing a spring 119, and a release chamber 121. The spring chamber 120 is connected via a line D, the release chamber 121 via a line R, with a braking valve 122, here an electromagnetically operated 4/2-way valve. This valve is additionally connected with the outlet 108 of the load pump 107 via the line 123, thus carrying load pressure. An additional line 124 leads to the tank 115. The flushing line 116 and the outlet line 114 are connected with the spring chamber 120.

In the release position shown, in which the valve 122 is activated, the spring chamber 120 carries tank pressure, which also applies for the ends of the connected outlet line 114 and flushing line 116, whereas the release chamber 121 is loaded by the load pressure. When the braking valve 122 is de-energised, being in the braking position, the release chamber 121 is connected with the tank 115, whereas the line D, that is, the flushing line 116 extending past the spring chamber 120, is blocked. Accordingly, the pressure in the spring chamber 120 quickly increases to the value of the load pressure, because of the incoming flushing fluid, which can no longer flow off. Therefore, the spring 119 is supported in its braking function by the pressure fluid pressure.

The connection of the flushing line 116 and the outlet line 114 of the flushing valve 112 with the spring chamber 120, which causes a simplified line arrangement, therefore disturbs neither the braking operation nor the flushing operation.

Figure 5:
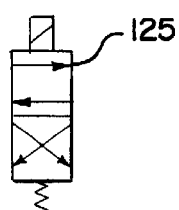
FIG. 5 is an alternative embodiment of the braking valve used in FIG. 4.
Figure 6:
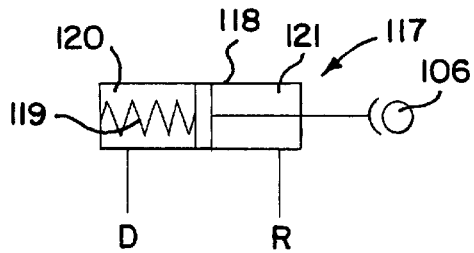
FIG. 6 is an enlarged view of the braking cylinder used in FIG. 4.

An alternative provides the replacement of the braking valve 122 by the braking valve 125 in FIG. 5. The difference substantially consists of the fact that the pressure decrease in the flushing line is not prevented by a blocking, but by the application of the load pressure, practically so that the spring chamber 120 is simultaneously filled with pressure medium from the outlet 108 of the load pump 107 and pressure medium from the flushing line.

Often, it is sufficient when the flushing line is merely passed by a leakage flow. In this case, the flushing line 116 of the motor 105 can also be called leakage line or drain line.

Figure 7:
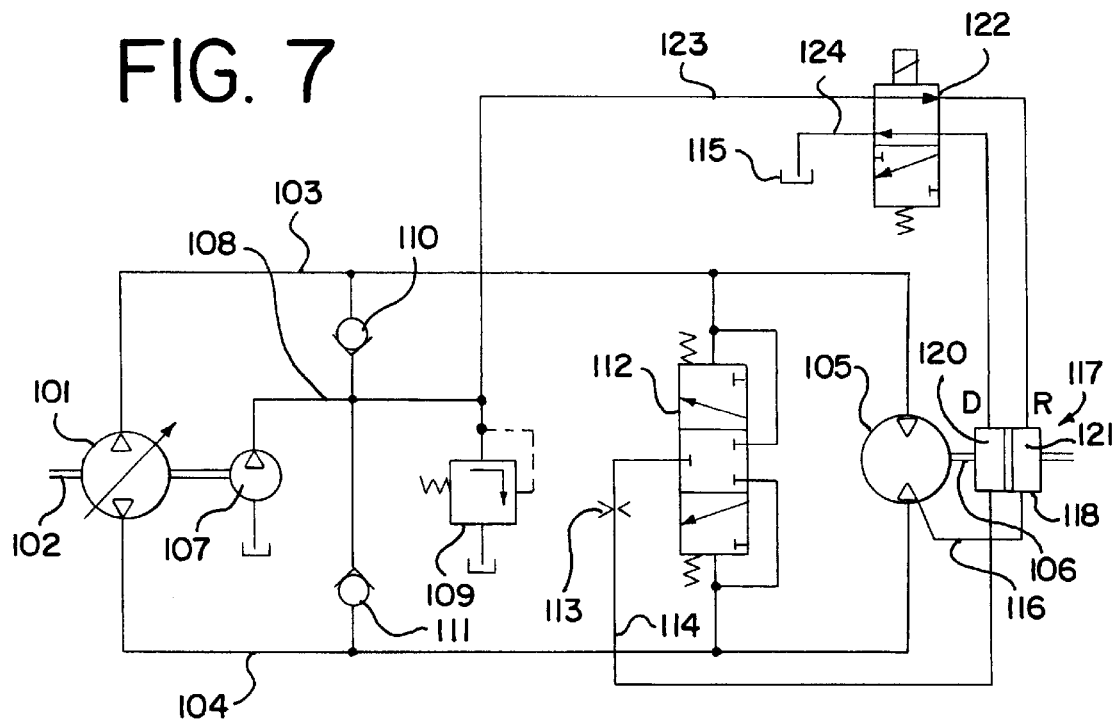
FIG. 7 is a schematic illustration of another embodiment of a driving system according to the invention.
Figure 8:
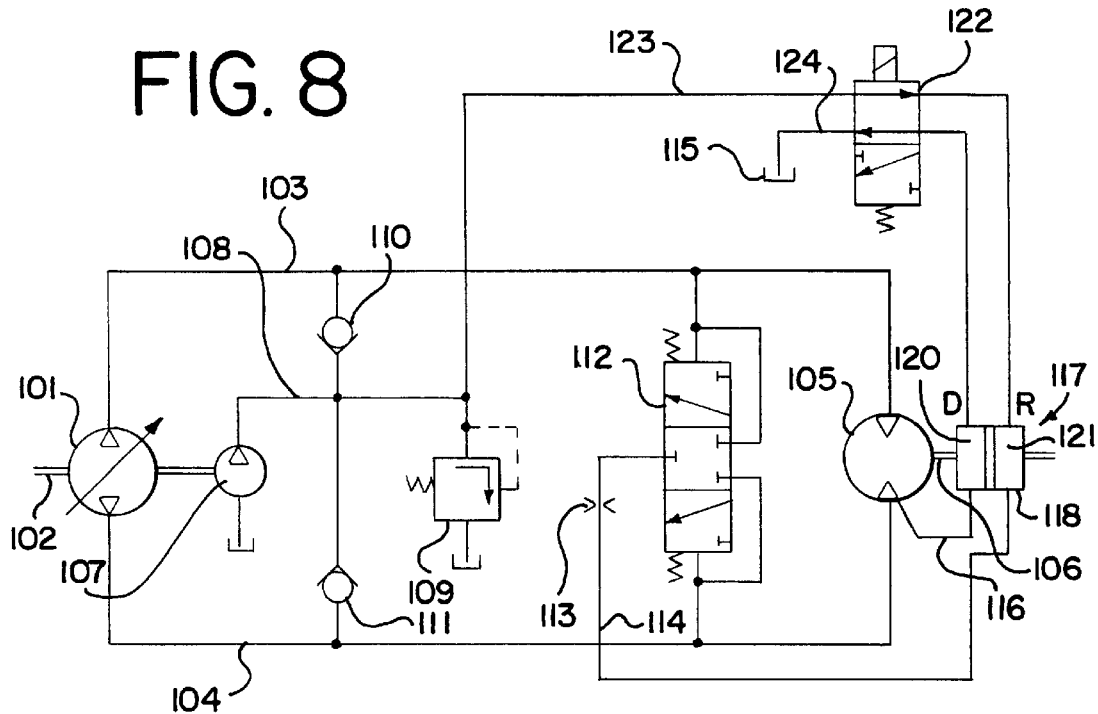
FIG. 8 is a schematic illustration of yet a further embodiment of a driving system according to the invention.

FIGS. 7 and 8 illustrate alternative embodiments which function in the same manner as the form of FIG. 4 described above. In FIG. 7, the flushing or leakage line 116 is connected directly to the release chamber 121. The outlet line 114 from the flushing valve 112 remains connected to the spring chamber 120. When the braking valve 122 is activated to the braking position, the release chamber 121, and hence the pressure in the flushing line 116, is connected to the tank 115, and pressure therefore does not accumulate in the release chamber. On the other hand, since the outlet from the spring chamber 120 is blocked, the pressure in the outlet line 114 accumulates quickly in the spring chamber 120, enhancing the braking function.

In FIG. 8, the flushing line 116 is shown connected to the spring chamber 120 and the outlet line 114 connected to the release chamber 121. When the braking valve 122 is activated, in exactly the same manner as described in relation to FIG. 4 and 7, the release chamber 121, and hence the outlet line 114, is connected to tank and no pressure accumulates in the release chamber. On the other hand, since outlet from the spring chamber 120 is blocked, the pressure in the flushing line 116 immediately builds in the spring chamber 120, increasing the braking function.

Various changes can be made to the invention without departing from the spirit thereof or scope of the following claims.

What is claimed is:

1. Hydraulic driving device comprising a housing, a hydraulic motor and a bearing arrangement with at least one roller bearing located in the housing, the bearing arrangement supporting for rotation an output shaft of the hydraulic motor, the bearing arrangement having an inner portion axially located-on the output shaft between a shoulder of the output shaft and a nut screwed onto the output shaft, a friction-disc pack surrounding the output shaft and being unrotatably connected with the output shaft via a key groove connection on the output shaft and being axially loaded against a radial, housing-fixed counter flange surface by a spring arrangement bearing on one side of the friction-disc pack through an annular piston, the shoulder being located on a distal side of the inner portion of the bearing arrangement opposite from an output side of the output shaft, and the friction-disc pack bearing on the inner portion of the bearing arrangement on a side opposite from the side upon which the spring arrangement bears.

2. Hydraulic driving device according to claim 1, in which the spring arrangement is a cup spring.

3. Hydraulic driving device according to claim 1 in which the annular piston comprises a substantially flat annular disc.

* * * * *